J. H. PARTRIDGE.
SPRING WHEEL.
APPLICATION FILED JULY 1, 1916.
1,220,676. Patented Mar. 27, 1917.
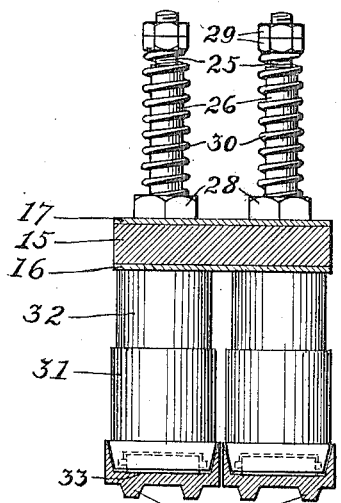
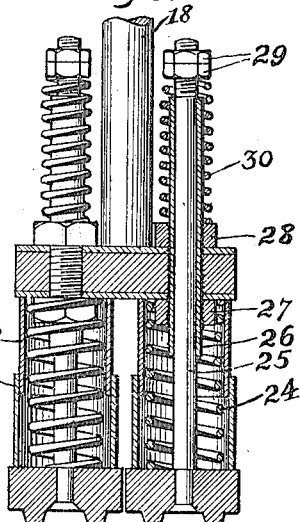
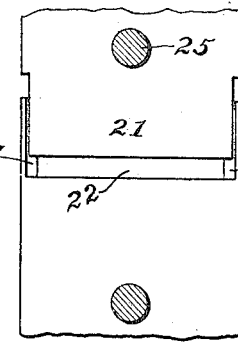
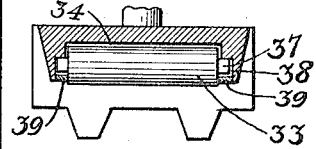
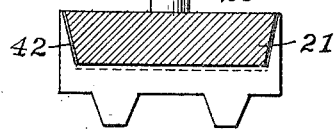
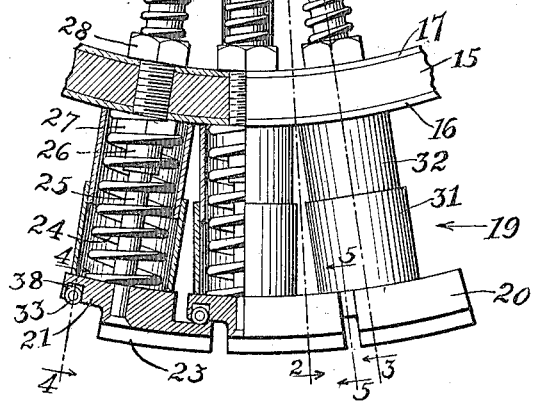
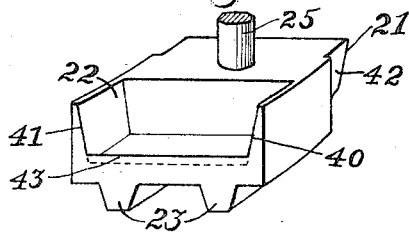
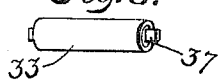
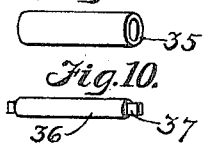
Inventor
John H. Partridge
by Hazard Berry & Miller
att'ys.

UNITED STATES PATENT OFFICE.

JOHN H. PARTRIDGE, OF LIKELY, CALIFORNIA.

SPRING-WHEEL.

1,220,676.  Specification of Letters Patent.  Patented Mar. 27, 1917.

Application filed July 1, 1916. Serial No. 107,091.

*To all whom it may concern:*

Be it known that I, JOHN H. PARTRIDGE, a citizen of the United States, residing at Likely, in the county of Modoc and State of California, have invented new and useful Improvements in Spring-Wheels, of which the following is a specification.

This invention relates to tires for vehicle wheels and particularly pertains to a resilient tire construction therefor.

It is an object of this invention to provide a resilient tire comprising a series of sectional units which are adapted to independently act to absorb road shock and which are so arranged as to readily conform to the contour of the road without danger of binding or otherwise injuring the various movable parts of the units.

Another object is to provide a resilient sectional tire which will support a load without depression under normal running conditions and which will yield upon impact to absorb the excessive vibration and road shock incident to travel upon the highway.

Another object is to provide means for preventing sudden rebound of the units of which the tire is composed, said means acting in a resilient manner to maintain the tire in a full floating position irrespective of the impact thereagainst.

Another object is to provide simple telescoping housing members adapted to incase the primary spring members and adapted to accommodate the variations in length of the springs as they perform their cushioning function.

Another object is to provide the tire sections with an overlapping arrangement whereby mud and dirt will be substantially eliminated from said overlapping joint and will thus provide suitable bearing space for anti-friction bearings adapted to be interposed between said overlapping ends and cause the sections to move in an easy manner and without wear in relation to each other.

Another object is to provide a tire stem and a bearing sleeve therefor, said stem and sleeve being formed in such a relation to each other that the upward movement of a tire section will be limited and said section will be suitably supported in case of the breakage of the spring members and thus allow the vehicle to be used until repairs may be made.

It is a further object to provide a resilient wheel of a construction which will readily permit an interchange of parts without dismantling the entire wheel, said parts being duplicated so that the manufacturing cost will be reduced.

Other objects will appear hereinafter.

The invention is illustrated in the accompanying drawings in which:

Figure 1 is a view in side elevation and section of a segmental portion of a vehicle wheel constructed according to the present invention.

Fig. 2 is a view in vertical section as seen on the line 2—2 of Fig. 1 and illustrates the various vital parts of the tire construction in elevation.

Fig. 3 is a view in partial vertical section and elevation as seen on the line 3—3 of Fig. 1 and particularly shows the disposition of the compression and rebound springs in relation to each other and the felly.

Fig. 4 is a view in vertical section as seen on the line 4—4 of Fig. 1 and illustrates the anti-friction roller and its mounting within the end of a tire segment.

Fig. 5 is a view in vertical section through the tire segment as seen on the line 5—5 of Fig. 1.

Fig. 6 is a perspective view of a tire segment as seen looking toward the female end of the section.

Fig. 7 is a fragmentary view in plan and particularly shows the overlapping arrangement of adjacent ends of the tire segments.

Fig. 8 is a perspective view of an assembled antifriction roller as used between the terminating edges of the segment.

Figs. 9 and 10 are views in perspective illustrating the component parts of the roller and particularly show the spindle and sleeve.

Referring to the drawings more particularly, 15 indicates an annular wheel felly which is bound around its outer periphery by a metallic band 16 and around its inner periphery by a metallic band 17. The felly member 15 is mounted upon a suitable hub of a vehicle wheel by means of a series of radial spokes 18. The spokes and felly with their component hub and band portions comprise the body frame upon which a resilient tire 19 is mounted and which is the essence of the present invention.

The tire 19 is here shown as comprising a series of segmental tire sections or tread portions 20 which are formed of a suitable wearing and tractive substance. The segments are approximately rectangular in shape and are provided at one end with the male extension portion 21 which is adapted to overlap and lie within a recess portion 22 of the adjacent segment. It will therefore be seen that the opposite ends of each segment are formed with a male and female portion. The sides of the segment are vertically disposed. In order to prevent sidewise skidding, each section is provided with a series of parallel and longitudinally extending bead portions 23 which are mounted on the outer face of the tire and form the tread portion thereof. The opposite or inner face of each segment provides a suitable bearing surface for one end of a compression spring 24, the opposite end of which bears against the tire band 16. This spring is provided to absorb the road shock and vibration to which the tire is subjected and thereby supports the segmental tire portions in a resilient manner.

The tire segments are held in relation to the spring members 24 by means of stems 25 which are suitably secured to the tire segments and extend inwardly therefrom through a bearing sleeve 26 mounted to extend through the felly. The bearing sleeve is held in position by lock-nuts 27 and 28 disposed upon opposite sides of the felly and adapted to engage the threaded periphery of the sleeve. The stem 25 extends inwardly from the inner end of the sleeve 26 and is engaged by a pair of stem nuts 29 which are mounted on the threaded terminating end of the stem, said nuts being spaced from the end of the sleeve a proper distance to limit the movement of the tire segment and prevent its being drawn out of overlapping engagement with adjacent segments in case the tire springs 30 are broken. Adjustment of nuts 29 will vary the tension of the springs 24 and 30 and determine the resilient riding qualities of the tire. As a means to prevent excessive rebound of a tire segment after having been subjected to a violent shock, a rebound spring 30 is provided each tire stem and is adapted to be placed over the sleeve 26 and bear between the nut 28 and the inner lock-nuts 29. In this manner each tire segment will be held in a floating position and will be resiliently cushioned in its movement either inwardly or outwardly from the wheel felly.

In order to prevent the compression spring 24 from becoming clogged with mud and dirt and thereby render it inoperative, each of said springs is inclosed within a telescoping casing composed of an outer member 31 and an inner member 32, said members being suitably secured upon the tire segment and the felly band 16, respectively. As seen in the drawings, these members overlap each other and will telescope upon the compression of the spring 24.

Referring particularly to Figs. 2 and 3 of the drawings, it will be seen that the tire is composed of a series of units each of which consist of a tire segment, a compression spring, a telescoping closure therefor, a tire stem and a guide sleeve within which it reciprocates, as well as a rebound spring. This unit is made in duplicate and a series of them are mounted around the wheel felly in two continuous rows close beside each other. This arrangement allows the segments in the two rows to work independently of each other and thereby permits the tread of the tire to conform to inequalities in the road bed, thus preventing bending and other damage which might occur.

As a means for satisfactorily overlapping the adjacent ends of the tire segments and preventing friction and excessive wear therebetween, rollers 33 are provided and mounted within a recess 34 formed in the lower side of the male engaging end 21. The roller is constructed with a tubular sleeve portion 35 and a central spindle 36, said spindle being formed with squared end portions 37 which seat within squared recesses 38 upon the opposite sides of the recess 34. The spindles are held in position by means of plates 39 which are suitably secured over the recesses 38 and are adapted to be removed when repairs are necessary. In order to prevent mud from entering the recess 22, said recess is provided with tapered side walls 40 and 41 adapted to lie adjacent tapered faces 42 of the extension members 21. An upturned bead 43 is formed along the marginal edge of the floor of the recess 22 and between its side walls. In this manner a movable joint is afforded between the ends of adjacent tire segments without great probability of foreign material entering therebetween.

In assembling a tire of the above construction, the segments 20 are each provided with a tire stem 25 to which it is securely fastened. This stem is reciprocably mounted within sleeve 26 and there secured by nuts 29 and further assembled to comprise a tire unit as previously described. The over-lapping ends of the tire sections are fitted within each other and form a continuous peripheral tread portion. When the tire is so assembled it is ready for use.

In operation, the tire sections successively bear upon the road as the wheel rotates and will, under normal conditions, maintain the tread of the tire in a continuous circular shape. The compression springs 24 are of sufficient tension to support the weight of the vehicle while upon a smooth surface. However, when an excessive speed is attained and vibration occurs or when severe road shocks are produced, the springs 24 compress and absorb the force of the shocks. The springs will rebound and the force of the rebound will be absorbed within the rebound springs 30.

It will thus be seen that this resilient tire construction will satisfactorily support the weight of a vehicle under normal conditions and will cushion it when violent shocks are transmitted thereto and that said tire may be readily adjusted to become sensitive to various forces and provide a tire with varying cushion qualities.

I claim:

1. A spring wheel, comprising in combination with a wheel felly, a series of radially disposed adjustably mounted sleeves therethrough, tire stems adapted to reciprocate within said sleeve, an overlapping tire segment secured to each stem, antifriction bearing members disposed between the overlapping ends of the tire segments, means whereby each of said segments may be resiliently held against inward and outward movement, and means whereby the resilient members may be adjusted to produce varying tensions.

2. The combination with a wheel having a felly, a flexible tire comprising overlapping tire sections, resilient means holding said sections in spaced relation to said felly, said means comprising a series of tire stems one of which is secured to each section and slidably mounted through said felly, tubular stem guides secured to and extending from the circumferential faces of said felly, helical tire springs encircling said tire stems and disposed between said felly and said tire sections, helical rebound springs encircling the inner sections of said tire stems, and telescoping mud-guards inclosing said tire springs.

3. The combination with a wheel having a felly, a flexible tire composed of overlapping tire sections, resilient means holding said sections in spaced relation from said felly, said means comprising a tire stem secured to each section and slidably mounted through said felly, tire stem guides secured to and extending from the circumferential faces of said felly, tire springs encircling said stems and disposed between said felly and said tire sections, rebound springs encircling the inner sections of said tire stems, telescoping mud-guards encircling said tire springs, and roller bearing members disposed between the overlapping ends of said tire sections.

In testimony whereof I have signed my name to this specification.

JOHN H. PARTRIDGE.

Copies of this patent may be obtained for five cents each, by addressing the "Commissioner of Patents, Washington, D. C."